US005808182A

United States Patent [19]

Stumpf

[11] Patent Number: 5,808,182

[45] Date of Patent: Sep. 15, 1998

[54] TEST HEAD FOR RESPIRATOR MASKS

[76] Inventor: Willi Stumpf, Griethweg 2, D-69198 Schriesheim, Germany

[21] Appl. No.: 827,083

[22] Filed: Mar. 26, 1997

[30] Foreign Application Priority Data

Apr. 1, 1996 [DE] Germany .......................... 296 05 844.0

[51] Int. Cl.[6] ...................................................... G01N 19/00

[52] U.S. Cl. ..................................................................... 73/40

[58] Field of Search ................................ 73/865.4, 865.6, 73/37, 40, 40.7, 49.8

[56] References Cited

U.S. PATENT DOCUMENTS 4,796,467 1/1989 Burt et al. ................................ 73/1.63

5,289,819 3/1994 Kroger et al. .............................. 73/40

*Primary Examiner*—Robert Raevis

*Attorney, Agent, or Firm*—Panitch Schwarze Jacobs & Nadel, P.C.

[57] ABSTRACT

A testing head for respirator and diving masks has a form approximating the human head with at least one air conduit traversing the head inside, wherein the testing head has an opening preferably in the area of the mouth, to which the air conduit is connected with its one end, while its other end can be connected with air supply or air exhaust or else testing devices. The testing head has a covering of elastically pliable material which at least partially encloses the head pressure tight on its exterior, wherein the mentioned opening is recessed, and wherein the testing head has a compressed air line which connects the intermediate space between the head and the covering with a compressed air supply for inflating the covering.

8 Claims, 2 Drawing Sheets

TEST HEAD FOR RESPIRATOR MASKS

BACKGROUND OF THE INVENTION

The invention relates to a testing head for respirator and diving masks in a form approximating the human head, with at least one air conduit traversing the interior of the head, wherein the testing head, preferably in the mouth area, has an opening to which the air conduit is connected at its one end, while its other end can be connected to air supply or air exhaust or testing devices.

Testing heads of this type are used in order to test respiration-controlled dosing valves, for example with respirator and diving masks, as well as the masks themselves for their capacity to function. With these heads, inhalation and exhalation resistance, and throughput amount and tightness are investigated by buckling the mask on the testing head adapted to the form of the human head and simulating respiration through the air conduit by an artificial lung with sinusoidal pressure distribution.

If this testing head is now used for leakage tests, wherein one subjects the mask to a certain excess pressure and then waits to see at what speed this excess pressure diminishes, the problem frequently arises that the mask is not sitting tightly enough on the testing head. For one, this problem lies in the varying construction of different mask makes when always using the same testing head, and second, the flexibility of the testing head does not correspond exactly enough to that of the human head. In order to prevent leaks in the sealing surface areas and to be able to examine the mask itself for its pressure tightness, the leaky places must, for example, be subjected to checking with leak detecting foam and must, for example, be sealed with a cream or the like.

In order to avoid this expenditure, it is also known to use another testing head for investigating tightness of the mask, which consists of an inflatable, highly elastic rubber balloon. This rubber balloon is not suited, however, for incorporating an air conduit connection, as would be necessary, for example, for measuring throughput, since the inflatable, soft testing head would be too unstable for this.

SUMMARY OF THE INVENTION

Proceeding from this, underlying the present invention is the object of making available a testing head which can be used not only for masks of any desired size, but also for all necessary function tests, without requiring an adaptation to the testing head or even its exchange.

This object is accomplished in accordance with the invention in that the testing head has a covering of elastically pliable material which at least partially encloses the head in a pressure tight manner on its exterior, wherein the mentioned opening is recessed, and in that the testing head has a compressed air line which connects the intermediate space between the head and the covering with a compressed air supply for inflating the covering.

From this results the advantage that if the covering covers all possible sealing surface areas of the masks to be put on, it can be inflated in such a manner that it lies tightly against the edge of the mask. In addition to those tests of function which are also possible with a conventional testing head, namely measurement of inhalation or exhalation resistance or the throughput amount, it is now also possible to investigate without problem the pressure tightness of the mask using the same testing head. Since on account of the guaranteed tightness of the transition regions between testing head or covering and mask, this region does not have to be tested first and subsequently sealed before one can begin with the actual leakage test.

In order to guarantee the function of the testing head in accordance with the invention, it is inherently only necessary that the covering enclose the testing head in the sealing surface area of the mask to be put on and that it be secured pressure tight on the testing head outside this area. However, it can also be just as advantageous from certain points of view to provide a configuration of the covering which deviates from this. Hence, for example, a simple embodiment entails the covering completely enclosing the testing head and being attached pressure tight to the testing head at least in the neck region of the simulated head. In this way it is assured that no restrictions exist with regard to the size of the mask to be examined. Rather, the testing head would even be suited for those masks which cover a large part of the head.

It is equally possible not to inflate the testing head itself with compressed air, but rather to provide an approximately annular air pressure element of elastically pliable material, which is arranged between the testing head and the covering in the sealing surface area of the mask to be applied, and whose interior is connected with the compressed air supply. This compressed air element can be constructed, for example, in the form of a tube, wherein the testing head has a recess on its exterior for receiving the inflatable tube. The covering here, owing to its elastic characteristics, serves to fix the position of the tube rather than to close off the sealing surface area, which it only indirectly achieves in that the tube presses it against the mask edge.

It is moreover advantageous if a second covering is arranged between testing head and covering, which is connected pressure tight with the first covering, and that the intermediate space between first and second covering is connected with the compressed air supply. An inflatable hood of this type has the advantage that the testing head itself does not have to be constructed pressure tight. Thus, the head need only serve to guarantee stability and to fix the air conduit connection to itself only over partial areas. In this way, not only can the weight of the testing head be reduced, but access to air conduits or any other possible measurement leads traversing the testing head is simplified.

On the other hand, in the event that no second covering is provided, the testing head itself must be constructed closed pressure tight at least in the area of the covering, and can for this purpose be made appropriately of a solid material, such as metal or plastic.

As a material for the covering, latex is recommended, for example, in view of its high elasticity and tightness, and latex can also be used as the material for the annular compressed air element, for which production in a dipping procedure is suited, for example.

Further features and advantages of the present invention emerge from the following description of embodiments on the basis of the drawings:

BRIEF DESCRIPTION OF THE SEVERAL VIEWS OF THE DRAWING

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 5 shows the testing head from FIG. 4 in profile with mask put on; and

DETAILED DESCRIPTION OF THE INVENTION

Figure 1:
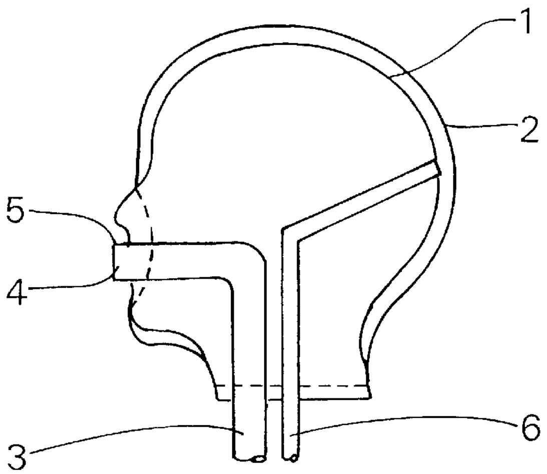
FIG. 1 shows a testing head of the invention in sectional profile.

A testing head 1 is represented in FIG. 1 which is modeled on the shape of the human head and has an elastic covering 2, which almost completely encloses the head on its exterior. Only in the area of the mouth as well as in the neck region does it have openings, whose respective edge is fixed pressure tight on the testing head. An air conduit 3 is moreover manifest in FIG. 1 which, proceeding from an air supply or air exhaust or testing device (not depicted), extends into the testing head while traversing the neck region of the testing head, and exits again with its free end 4 in the mouth area of the testing head through an opening 5. This air conduit serves, for example, to measure throughput amount, when it is connected to an artificial lung, and feeds air from the environment through the mask to the artificial lung or transports the air in the opposite direction.

In addition, the testing head has a compressed air line 6, which is connected with a compressed air supply (not depicted) and with its free end opens into the intermediate space between testing head 1 and covering 2. In this way, the covering can be inflated and be pressed against the applied mask, in order to assure a sealing connection with the latter. To be sure, the course of the compressed air line 6 is immaterial for the function of the testing head. Nevertheless, it is recommended that this likewise be inserted into the testing head through the neck area and, after traversing the head, be allowed to open at a suitable place into the intermediate space between testing head and covering while traversing the same.

Figure 2:
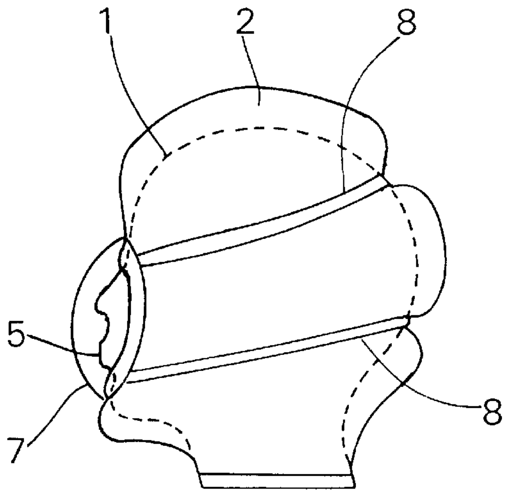
FIG. 2 shows the testing head of FIG. 1 in side view with mask applied.

FIG. 2 depicts the testing head of FIG. 1 with a mask 7 put on it and inflated covering, wherein the covered testing head area is represented by dotted lines. It should be mentioned in this connection that the mask 7 is only drawn schematically to simplify the representation, without its own air connection openings, such as respirator valves and the like. Proceeding from the mask extend two or more straps 8, which run around the testing head to the other side of the mask and assure that the mask presses against the covering. In both of the transition areas between mask and covering or testing head represented in side view, it can be seen how the inflated covering presses against the sealing surfaces of the mask and swells strongly in the areas adjacent to the sealing surfaces, to such an extent that it initially runs almost tangential to the mask. A similar effect is also apparent on the back side of the head in the strap regions, where the covering 2 swells in the regions adjacent to the straps 8.

Figure 3:
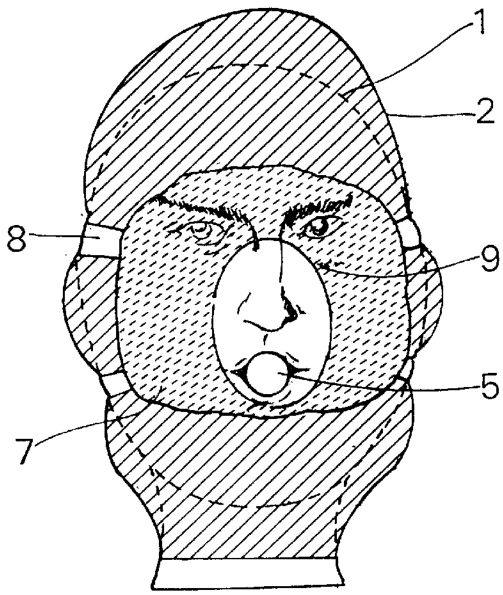
FIG. 3 shows the testing head of FIG. 2 in front view with mask applied.

Finally, FIG. 3 shows the testing head from FIG. 2 in a frontal view and in particular displays the extent of the covering 2: This is represented in FIG. 3 outside the mask area with solid lines and within the mask area with hatched dotted lines and covers the testing head 1 almost completely up to the mouth area around the opening 5 as well as the neck area of the testing head. The covering has a cutout 9 in the mouth area, which forms a recess for the opening 5 and chiefly has the purpose of not blocking the air conduit and making possible air supply or exhaust through the opening 5. The size of the cutout 9 is basically immaterial. It must, however, be assured that it does not extend into the sealing surface area of the applied mask, and that, above and beyond this, a pressure tight connection is provided between covering 2 and testing head I in the area of the cutout 9.

The same requirement of pressure tight connection applies for the neck region. The covering 2 must there also be secured in position on the testing head impermeable to air. As already apparent from FIG. 2, it is apparent from FIG. 3 how the covering swells outside the straps 8 of the mask 7 and consequently indicates the same behavior for the sealing surface areas.

Figure 4:
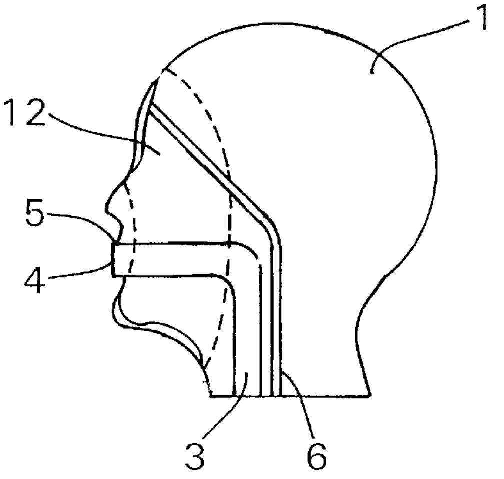
FIG. 4 shows an alternative embodiment of a testing head in sectional profile.

An alternative embodiment is represented in FIG. 4, wherein the testing head 1 is again provided with an air conduit 3 and a compressed air line 6, which corresponds to the two lines from FIG. 1. As is apparent from the dotted lines in this side section representation, a covering 12 is provided which extends only over a partial area of the testing head, which must be at least somewhat larger that the sealing surface area of the mask to be applied. Even in this case, the transition area between the covering 12 and testing head 1 (along the dotted lines) must be constructed pressure tight in order to guarantee the inflation of the covering when it is subjected to pressure.

Since the covering extends only approximately over the face area of the testing head 1, the compressed air line 6 is also arranged so that it exits out of the testing head in this face area into the intermediate space between covering and testing head.

Figure 5:
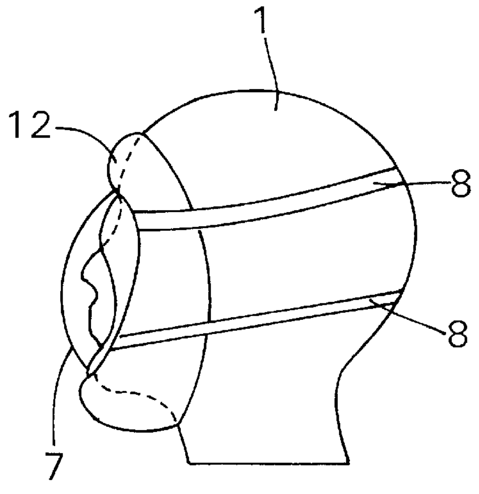

FIG. 5 depicts the testing head from FIG. 4 with applied mask 7 and swollen covering 12 and makes clear that the area of the testing head covered by the covering 12 suffices completely for sealing the mask size represented. The mask in FIG. 5 is also only indicated schematically for simplification and has two straps 8 which press the mask 7 against the testing head 1 or the covering 12.

Figure 6:
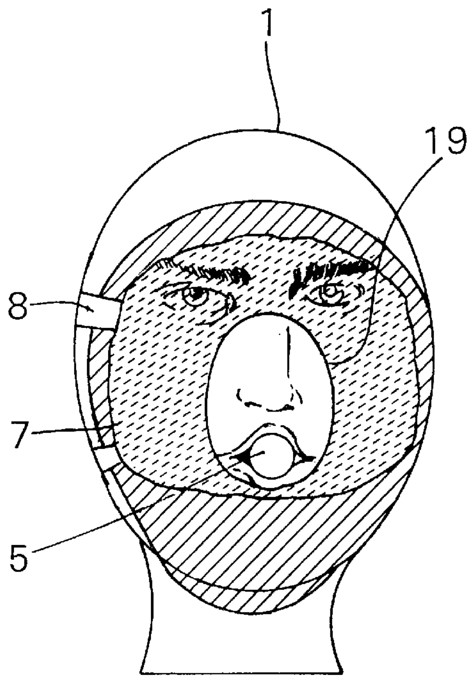
FIG. 6 shows the testing head from FIG. 5 in front view.

Finally, FIG. 6 shows the testing head with applied mask from FIG. 5 in a frontal view, wherein the representation of the covering rests upon the same principle as with FIG. 3. As is clear from FIG. 6, the covering corresponds to the covering 2 of FIG. 3 only in the mouth area, in that it has a cutout 19 which is constructed somewhat larger than the opening 5 and thereby forms a recess for the opening 5. Outside the mask area, the covering 12 extends (as already indicated in FIG. 4) only over a partial area of the head, namely approximately over the face area, and is secured in place pressure tight with its peripheral area on testing head 1.

In sum, the advantage of the present invention lies in that one and the same testing head can be used for the largest variety of mask sizes and makes and all different tests necessary for testing the mask, without having to undertake an adaptation to it. This is achieved in accordance with the invention by providing a covering which is constructed as inflatable at least in the sealing surface area.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A testing head for respirator and diving masks, comprising a simulated head (1) having a form approximating a human head and having at least one air conduit (3) traversing an interior of the simulated head, the air conduit being connected at one end (4) with an opening (5) in the simulated head and its other end being connectable with one of an air supply, an air exhaust and a testing device, wherein the simulated head (1) has a covering (2, 12) of elastically pliable material, which encloses the simulated head in a pressure tight manner over at least a portion of its exterior, wherein the simulated head (1) has a compressed air line (6) which connects an intermediate space between the simulated head (1) and the covering (2, 12) with a compressed air supply for inflating the covering.

2. The testing head according to claim 1, wherein the covering (2) almost completely encloses the simulated head (1) and is connected in a pressure tight manner with the simulated head at least in a neck region of the simulated head.

3. The testing head according to claim 1, wherein the covering (12) encloses the simulated head (1) in a sealing surface area of a mask (7) to be applied to the simulated head and is secured pressure tight on the simulated head outside the sealing surface area.

4. The testing head according to claim 1, wherein the simulated head (1) is constructed pressure tight closed in the portion enclosed by the covering (2, 12).

5. The testing head according to claim 1, wherein the covering (2, 12) comprises latex.

6. The testing head according to claim 1, wherein the simulated head (1) comprises at least one of metal and plastic.

7. The testing head according to claim 1, wherein the opening (5) is located in a mouth area of the simulated head (1).

8. The testing head according to claim 1, wherein the covering (2, 12) has a cutout (9, 19) which provides a recess for the opening (5).

* * * * *